United States Patent [19]

Harbolt et al.

[11] 3,857,499

[45] Dec. 31, 1974

[54] CARGO HANDLING EQUIPMENT

[75] Inventors: Bruce A. Harbolt, Northridge; David A. Claghorn, Los Angeles, both of Calif.; Delbert W. Block, Jerome, Idaho

[73] Assignee: Union Oil Company of California, Los Angeles, Calif.

[22] Filed: Oct. 31, 1973

[21] Appl. No.: 411,357

[52] U.S. Cl............................................. 214/15 D
[51] Int. Cl............................................ B65g 33/14
[58] Field of Search......... 214/15 C, 15 D, 10, 15 R

[56] References Cited
UNITED STATES PATENTS

| | | | |
|---|---|---|---|
| 3,446,331 | 5/1969 | Williams | 214/15 R |
| 3,458,028 | 7/1969 | Johannessen | 214/15 R |

*Primary Examiner*—Stanley H. Tollberg
*Attorney, Agent, or Firm*—Richard C. Hartman; Dean Sandford; Michael H. Laird

[57] ABSTRACT

There is disclosed a device for transferring bulk granular material such as granular fertilizer and dispensing it into containers, bags and the like which comprises a platform, cable attachment means on said platform whereby the platform can be suspended from a surrounding structure, at least one solids lift mounted on the platform with solids inlet means below and solids discharge means above the platform, at least one solids conveying means supported by the platform and operative to convey bulk granular material laterally towards the lower end of the lift means, receiving means for bulk granular material carried by the platform and in communication with the discharge of the solids lift and at least one measuring means carried by the platform and operative to dispense measured masses of a predetermined amount of granular material at selected intervals whereby the granular material can be transferred into packages of uniform amounts. The device is suited for use on bulk cargo transport vessels, particularly ships. The platform is adapted to be lowered into the hold of a ship through the cargo hatch and suspended therein by cables extending to the deck of the ship. The device transfers the particulate, bulk cargo from beneath to above its platform where bagging equipment can be used to package the cargo. The bags of cargo are then placed on a conventional sling or other conveying means for removal from the hold using the ship's rigging.

15 Claims, 3 Drawing Figures

CARGO HANDLING EQUIPMENT

BACKGROUND OF THE INVENTION

The invention relates to a bulk solids handling equipment and, in particular, relates to a device for bagging of bulk cargo which is particularly useful on board bulk cargo ships.

Granular materials which are produced and handled in large quantities are most economically handled in bulk lots, i.e., in lots exceeding about 500 tons. Typical of such materials are the various granular fertilizers such as urea, ammonium sulfate, potassium chloride, superphosphate, triple superphosphate, as well as mixtures thereof. It is common practice to transport these materials as bulk cargo, in large, ocean-going freighters having capacities from 1,000 to about 20,000 tons divided into two to about 10 cargo holds. Most of the major ports of the industrialized world have bulk cargo handling facilities to permit loading and unloading of these ships.

The ports of underdeveloped nations, however, often lack bulk cargo handling facilities such as solids conveyors and storage facilities. Consequently, a major proportion of the granular cargo transported throughout the world must be packaged and loaded onto ships in containers, e.g., in bags and other receptacles. This special handling of the granular material places a premium on the price of the cargo which under-developed nations can ill afford to absorb. In addition, it decreases the efficiency of the manufacturer's distribution system and requires the use of dual distributing systems, i.e., systems for bulk and for packaged cargo.

Bulk cargo handling facilities are too cumbersome and expensive to be permanently installed on ships and, accordingly, it would not be a practical solution to provide conventional bulk cargo unloading facilities on a ship. It would, however, be desirable to provide means for packaging or bagging of bulk cargo on a ship to permit use of the ship's cargo handling facilities such as its crane and rigging for unloading of the packaged cargo.

BRIEF DESCRIPTION OF THE INVENTION

This invention comprises means that can be carried on a ship and used for packaging of bulk cargo into containers or bags of uniform and predetermined quantity, preferably on a weight basis. Specifically, the invention comprises means that can be lowered into the bulk cargo hold of a ship through the cargo hatch and operated within the hold of the ship to package uniform masses of bulk granular material cargo into containers or bags. In its preferred embodiment, the invention comprises a platform that can be lowered and raised from the deck of the ship by cables. The platform supports at least one solids lift which is operable to convey granular material from a solids transfer station beneath to a solids receiving station above the platform with solids receiving means at the solids receiving station which is connected to the discharge of the solids lift to receive the granular material and at least one weighing and dispensing means such as a conventional weighing bagger operative to dispense the solids as measured masses of predetermined amounts of granular material into containers or bags to provide packages of uniform mass. The device also includes at least one laterally extendable solids conveyor which is operative to transport the granular material from remote areas of the hold to the solids transfer station which is located at the vicinity of the solids inlet of the solids lift. In this manner, the device can be lowered into a central position of the hold and will be operative to package granular material contained therein without substantial lateral repositioning within the hold.

DESCRIPTION OF PREFERRED EMBODIMENTS OF THE INVENTION

Figure 1:
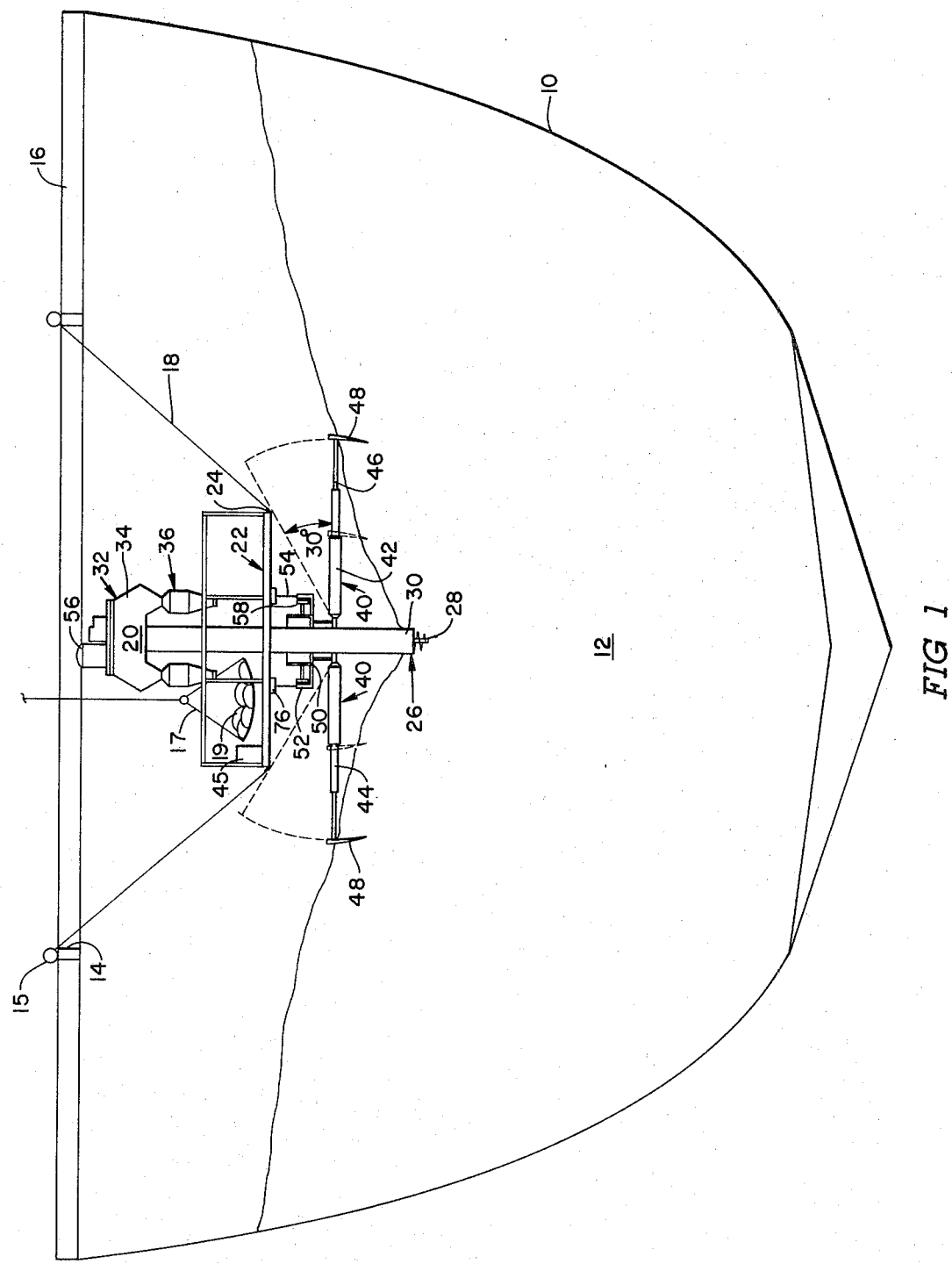
FIG. 1 schematically illustrates the device of this invention as it is positioned within the hold of the ship.

Referring now to FIG. 1, there is illustrated a cross-section of a typical cargo ship 10 having bulk granular material cargo 12 within a hold section. The cargo hatch 14 is shown through deck 16. Suspended on a plurality of cables 18 from the ship's deck 16 is the device 20 of this invention. Cables 18 extend from winches 15 which control the raising and lowering of the device in the ship's hold. The device comprises a platform 22 with cable attachment means 24 which are preferably located at each corner thereof. The platform carries at least one solids lift conveyor which is shown as a screw 28 coaxially mounted within a tubular conduit 30 that extends substantially vertically from a solids transfer station beneath the surface of the platform 22 to a solids receiving station above the platform. The upper end of conduit 30 and screw 28 terminate in solids receiving means 32 which is shown as a polygonal vessel having at least one and preferably two to four hoppers 34 which discharge into weighing and dispensing means 36 such as conventional baggers.

Also supported by the platform is at least one solids conveying means such as arm 40. The arm 40 is operative to convey solids laterally from remote areas of the hold to the solids transfer station which is beneath the platform and laterally adjacent to the inlet of lift conveyor 26 such that the angle of repose of the material will insure that the material will gravitate to the inlet of lift conveyor 26. As illustrated, the solids conveying means comprises an arm formed of telescoping conduits 42, 44 and 46. The outboard end of the smaller conduit bears a downwardly facing scraper blade or bucket 48 and the telescoping assembly is adapted to be powered by suitable means such as hydraulic pressure for the withdrawal and extension of telescoping sections 44 and 46.

As illustrated, there are two arms 40 which are similarly shaped and which are typically attached to a carriage assembly 50 that is rotatably carried by platform 22. The rotation of this carriage assembly assures that the radially directed arms 40 are operable in all radial directions from lift conveyor 26. The arms are pivotally attached to carriage assembly 50 to permit them to be raised through an angle in a vertical plane of at least about 30° from horizontal as indicated by the broken lines in the FIG. 1. The carriage assembly is suspended beneath the platform 22 on a circular track 52 that is secured to the under surface of the platform by means such as tie rods 54 which extend from ring 76 which is secured to the platform. The carriage assembly 50 has a plurality of wheels 58, preferably about four, which are mounted in outboard positions from the carriage assembly and which rest on the upper surface of track 52. Suitable power means, not shown, are included to rotatably drive wheels 58 and thereby rotate carriage assembly 50 about the vertical axis through the lift 26. Suitable power means, also not shown, are provided to raise and lower arms 40 as desired by pivoting these arms about their pivotal connection to carriage assembly 50.

The packages of bagged material can be deposited on platform 22 for removal from the hold using the ship's conventional rigging. As illustrated, sling 17 can be lowered through hatch 14 and the bags 19 can be placed in the sling by workers on platform 22.

The power for operating the device, i.e., the lift conveyor screw 28, carriage assembly 50 and arms 40 can be carried on the platform as element 45. Preferably, however, the power means for the lift conveyor screw 28 is mounted coaxially with screw 28 and is shown superimposed on vessel 32 as motor 56.

Figure 2:
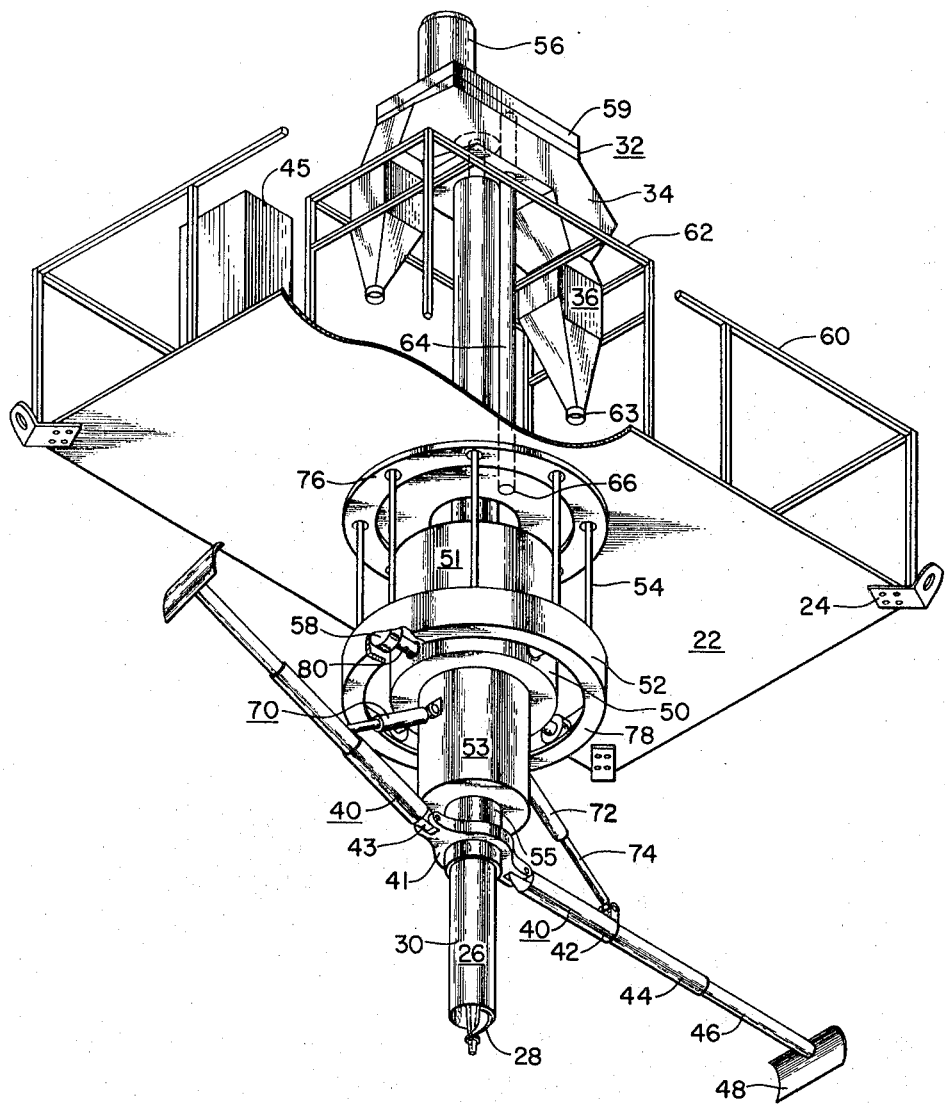
FIG. 2 is an isometric view of one embodiment of the invention.

Referring now to FIG. 2, the invention is shown in greater detail. The device is shown from its underside as it would be lowered from the deck of a ship to rest upon the bulk granular material cargo in the ship's hold. Platform 22 is shown with four eye brackets 24 bolted at its corners for attachment of the cable means and with a protective railing 60 disposed about its periphery. The upper surface of the platform 22 has a centrally disposed structure 62 which supports solids receiving means 32 that has a plurality of hoppers 34 which discharge directly into conventional weighing and bagging apparatus 36. The bagging apparatus is likewise supported by structure 62.

Any conventional packaging system can be used for measuring and dispensing masses of predetermined amounts of granular solids. A system which is useful is a mechanical weighing bagger such as model t38 or model F of the Howe Richardson bagging systems. These baggers are capable of weighing predetermined amounts from 10 to about 100 pounds of granular material and dispensing it through discharge spouts 63 into open-mouth, paper, textile or polyethylene bags. The baggers are capable of from five to about 15 discharges per minute. Volumetric measuring and dispensing units can also be used.

A substantially vertically disposed standpipe 64 is shown as extending from the upper portion of solids receiving vessel 32 downwardly to an open discharge through an aperture 66 in platform 22. This standpipe 64 serves as an overflow from an upper level in vessel 32 to prevent compacting or compressing of the granular material within the tubular conduit 30 of lift 26 in the event that the lift is operated when the vessel 32 is filled.

The lower end of the screw 28 is shown extending slightly beneath the lower end of conduit 30. Conduit 30 terminates at the base of vessel 32 and the shaft of screw 28 extends upwardly as shown in the broken lines into engagement with a gear reduction unit 59 which is driven by a gear on the shaft of motor 56.

The solids conveyor used for transferring the bulk material laterally into proximity with the inlet of lift 26 is shown as two arms 40 which are pivotally mounted on yoke 41 by clevis means 43 carried as an integral part of this yoke. A pin extends through a mating aperture in the inner end of arm 40 to provide pivotal connection of the arm to yoke 41. As previously mentioned, arm 40 is formed of tubular members 42, 44 and 46 which are in a telescoping array, as illustrated. The outboard end of conduit 46 bears a scraper blade such as 48 that is oriented to permit dragging of the granular material inwardly towards the solids transfer station adjacent the inlet end of solids lift 26.

If desired, arms 40 can be freely pivotal about the pin in clevis means 43. As previously mentioned, the telescoping array of arm 40 can be powered, preferably hydraulically, to extend and retract this arm. During the extension, blade 48 will ride up and over the granular material in the hold of the ship, and, upon contraction of arm 40, the orientation of blade 48 will cause the blade to dig into the granular material and drag the material inwardly toward the solids transfer station.

Preferably, the pivoting of arms 40 in a vertical plane is powered by motive means carried on the device. Various means can be used, hydraulic actuation means 70 are illustrated as comprising a cylinder 72 with a reciprocating piston secured to one end of extendable rod 74. One end of the cylinder is pivotally connected to the lower end of carriage assembly 50 while the opposite end of rod 74 is pivotally connected to arm 40. Hydraulic fluid is supplied to either side of a piston within cylinder 72 by suitable conduits which are not illustrated. Other means such as rack and pinion gear means or screw means could also be used for this purpose, as well as for the powered extension and contraction of telescoping arms 40.

The rotatable carriage assembly 50 is shown as comprising a first cylindrical housing 51 with a subjacent, slightly lesser diameter housing 53 and a lowermost sleeve 55 to which is secured yoke 41. The sleeve and cylindrical housing 51 and 53 fit loosely about the exterior of conduit 30 of solids lift 26. The exterior of housing 53 bears bracket means 55 which provide for the pivotal connection of cylinders 72.

Attached to the under surface of platform 22 is a mounting ring 76 which has secured to it a plurality of downwardly extending rods 54. These rods are secured to and support circular track 52. Track 52 has a flat annular surface 78 on which are supported wheels 58 which are secured to shafts 80 that extend outwardly from housing 51. A plurality of such wheels can be used such as three, four, or five, or multiples thereof. Four such wheels are shown disposed at 90 degrees angular increments. Shafts 80 are driven through suitable gear means internal of vessel 51 (not illustrated) by power means such as a hydraulic motor or an electric motor contained within housing 51. The hydraulic means, when employed, can be powered by a suitable hydraulic pump driven by an internal combustion engine or electric motor generally designated as 45 on the platform 22.

Upon arrival in a port which lacks bulk cargo handling facilities, the device of this invention can be lowered into the cargo hold of a ship through the cargo hatch opening and positioned with solids lift 26 embedded in the bulk of cargo within the hold. Motor 56 can be actuated to commence lifting of granular material through solids lift 26 and discharging the material into the solids receiving vessel 32 for distribution to hoppers 34 and a weighed dispensing through baggers 36. Operators standing on platform 22 can position bags beneath the discharges 63 of the baggers 36, remove the filled bags and place them on sling 17 which can rest on platform 22 or on the adjacent surface of the bulk cargo in the hold. The sling is supported by rigging and is attached to the ship's crane or lift to permit removal of the packaged cargo through the cargo hatch 14. In a typical embodiment, the device is provided with two, three or four baggers 36 which are capable of about 10 weighed discharges per minute of the granular cargo in weight amounts up to 100 pounds each. The device is therefore capable of operation to weigh and discharge from 2,000 to 4,000 pounds of granular material per minute with from two to about six men operating the packaging means.

Figure 3:
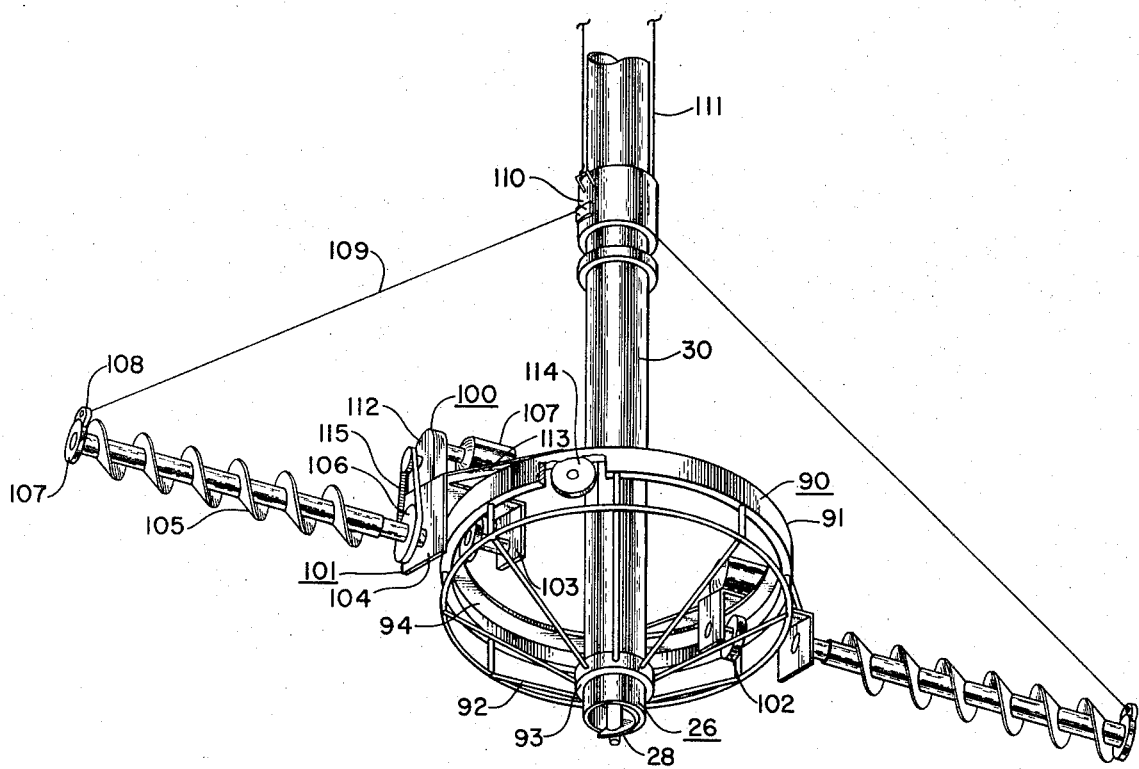
FIG. 3 is an isometric partial view of an alternative embodiment.

Referring now to FIG. 3, an alternative embodiment of the solids conveying means is shown. As illustrated, the carriage assembly 50 of FIG. 2 has been replaced with a circular track assembly 90 having mounted thereon at least one solids conveying means 100.

Circular track means 90 comprises an upright, circular flange 91 with a rim 94. The track is supported from the base of conduit 30 of solids lift 26 by a plurality of rods 92 which extend radially from a collar 93 which is secured to conduit 26.

The solids conveyor means which is mounted in circular track 90 comprise car means 101 in the form of a generally U-shaped bracket 104 which supports wheel means 102 from its innermost leg 103. Wheel 102 rolls on the undersurface of rim 94 of circular track 90. An arm 113 extends from the top surface of bracket 104 and bears a downward flange on which is rotatably mounted wheel 114 which also rolls on the undersurface of rim 94 to stabilize the conveyor means 100. The opposite leg 104 of bracket 101 has a bearing support for conveyor screw 105. The conveyor screw bears an inboard pulley means 106 which is driven by suitable means, e.g., belt 115 which extends from a driven pulley of gear box 112 and motor 107.

The outboard end of screw 105 bears wheel means 107 having an eye bracket 108 to which is secured tie cable 109 that extends inwardly and upwardly to connection with collar 110 that is slideably mounted about conduit 30. Suitable cable means 111 extend to platform 22 to permit collar 110 to be raised and lowered, thereby raising and lowering the outboard end of screw 105. Alternatively, tie cable 109 could extend to platform 22. Brackets 101 fit about circular track 91 with sufficient clearance to permit the brackets to be rocked or pivoted through a vertical angle of about 30° from the horizon and thereby permit raising and lowering of the outboard ends of the screw 105.

The solids conveying means 100 can be rotably driven or pulled about circular track 90. In normal operation, however, the rotational driving of screw 105 to convey granular material inwardly to the solids transfer station will be sufficient to propel the solids conveying means 100 about the circular track 91 and no additional motive means for effecting this movement need be supplied.

The operation of the device shown in FIG. 3 is substantially the same as that described with regard to the device of FIG. 2. The device is lowered into a ship's hold and motor 56 is employed to drive screw 28 and raise granular material through conduit 30 to the solids receiving station on the platform. When the device is embedded a sufficient depth in the bulk cargo in the hold, motor 107 is started on each of the solids conveyors 100 and these conveyors are then operative to transfer solids from lateral extremities of the ship's hold in a radial direction towards the solids transfer station that is adjacent the inlet of the solids lift means 26. The solids measuring and dispensing and packaging system employed with this embodiment can be the same as that shown with regard to FIG. 2.

The invention has been described by reference to the illustrated and presently preferred embodiments thereof. It is not intended that the invention be unduly limited by this illustrated and preferred embodiment. Instead, it is intended that the invention be defined by the means and their obvious equivalents set forth in the following claims.

We claim:

1. A device for transferring bulk granular material such as granular fertilizer and the like that comprises:

a platform;

cable attachment means on said platform whereby said platform can be suspended from a surrounding structure;

at least one solids lift mounted on said platform with granular material inlet means below and granular material discharge means located at a solids receiving station above said platform;

at least one solids conveying means supported by said platform and operative to convey granular material laterally towards a solids transfer station beneath said platform and adjacent the lower end of said lift means; and granular material receiving means carried by said platform at said solids receiving station and in communication with the said discharge means of said solids lift and including at least one solids measuring means carried by said platform and operative to dispense measured masses of a predetermined amount of said granular material at selected intervals whereby said solids can be transferred into containers of uniform amounts.

2. The device of claim 1 wherein said solids lift is a screw coaxially supported in a conduit.

3. The device of claim 1 wherein said solids conveying means comprises a plurality of radially extending conveyors.

4. The device of claim 1 wherein said solids conveying means comprises a scraper blade carried at the end of an arm and adapted for radial movement towards said solids receiving station.

5. The device of claim 1 wherein said solids conveying means is pivotally supported on a central yoke by clevis means permitting the pivotal raising and lowering of said means.

6. The device of claim 5 with motive means operatively connected to raise and lower the outboard end of said solids conveying means.

7. The device of claim 1 wherein said solids conveying means comprises a telescoping assembly of tubular members.

8. The device of claim 1 wherein said solids conveying means is rotatably supported about the lower end of said lift.

9. The device of claim 8 wherein said platform supports a circular track and said solids conveying means is carried by a rotatable carriage assembly supported on the track by a plurality of outboard wheels resting on the track.

10. The device of claim 9 wherein said assembly includes power means to drive said wheels and thereby rotate said assembly.

11. The device of claim 10 wherein said carriage assembly coaxially surrounds the lower end of said lift.

12. The device of claim 1 wherein said solids conveying means comprises at least one screw conveyor.

13. The device of claim 12 wherein the inboard end of said screw conveyor is mounted in bearing means of a bracket that is rotatably mounted on a circular track beneath said platform and surrounding the lower end of said solids lift means.

14. The device of claim 13 wherein the inboard end of said screw conveyor also bears pulley means with motive power means carried on said bracket and connected in driving relationship to said pulley means.

15. The device of claim 13 wherein the outboard end of said screw conveyor bears an eye bracket with a tie cable extending therefrom to said device to control the horizontal inclination of said screw conveyor.

* * * * *